(12) United States Patent
Hokazono et al.

(10) Patent No.: US 6,616,130 B2
(45) Date of Patent: Sep. 9, 2003

(54) CYLINDRICAL VIBRATION-ISOLATING DEVICE

(75) Inventors: Kiyoshi Hokazono, Toyota (JP); Fukuyoshi Kawakatsu, Komaki (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 09/950,039

(22) Filed: Sep. 10, 2001

(65) Prior Publication Data

US 2002/0043749 A1 Apr. 18, 2002

(30) Foreign Application Priority Data

Sep. 8, 2000 (JP) .......................................... 2000-272594

(51) Int. Cl.[7] .............................. F16F 1/38; F16F 15/08
(52) U.S. Cl. ................................ 267/141.1; 267/141.2; 267/140.5; 267/294; 267/153
(58) Field of Search ................................. 267/141, 152, 267/292–294, 141.1, 140.13, 140.12, 141.2–141.7, 140.5, 153, 219, 220; 277/397, 402; 248/636, 638, 634; 180/300, 297, 312; 384/222; 403/225

(56) References Cited

U.S. PATENT DOCUMENTS 4,767,108 A * 8/1988 Tanaka et al. ......... 267/140.12
5,899,431 A * 5/1999 Lefol .................... 267/141.1
2002/0043749 A1 * 4/2002 Hokazono et al. ..... 267/140.12

FOREIGN PATENT DOCUMENTS

| JP | 57-165827 | 10/1982 |
| JP | 9-158975 | 6/1997 |
| JP | 81502 | * 3/2002 |

* cited by examiner

Primary Examiner—Douglas C. Butler
(74) Attorney, Agent, or Firm—Rossi & Associates (57) ABSTRACT

A cylindrical vibration-isolating device including: an elastic body interposed between an inner and an outer metal sleeves disposed coaxial relationship with each other, such that at least one axial end portion of the inner sleeve is located axially outward of the elastic body, a connecting rubber layer integrally formed with and protruding axially outwardly from the elastic body and secured to an outer circumferential surface of the end portion of the inner sleeve; and an annular sealing-rubber member formed integrally with and protruding axially outwardly from the connecting rubber layer to protrude axially outwardly from an end face of the inner metal sleeve, which has a radially inner base portion rising with a concave surface from a first axial position on the outer circumferential surface of the end portion, which is axially inwardly spaced apart from the end face of the inner sleeve.

17 Claims, 5 Drawing Sheets

CYLINDRICAL VIBRATION-ISOLATING DEVICE

INCORPORATION BY REFERENCE

The disclosure of Japanese Patent Application No. 2000-272594 filed on Sep. 8, 2000 including the specification, drawings and abstract is incorporated herein by reference in its entirety.

BACKGROUND OF THE INVENTION

1. Field of the Invention

The present invention relates generally to a cylindrical vibration-isolating device which includes an inner metal sleeve and an outer metal sleeve that are disposed in a radially spaced-apart relation with each other and are elastically connected to each other by an elastic body interposed therebetween, and which is interposed between two members of a vibration system for connecting these two members in a vibration-isolating fashion. More specifically, the present invention is concerned with such a cylindrical vibration-isolating device which includes a sealing-rubber member adapted to seal a bore of the inner metal sleeve so that entrance of water or other objects into the bore of the inner metal sleeve is effectively prevented, with the vibration-isolating device is installed between the two members of the vibration system.

2. Description of the Related Art

A cylindrical vibration-isolating device is known as one type of a vibration damping or isolating mount that is interposed between two members of a vibration system for flexibly connecting the two members in a vibration damping or isolating fashion. The cylindrical vibration-isolating device comprises an inner metal sleeve and an outer metal sleeve disposed radially outwardly of an inner metal sleeve with a suitable radial spacing therebetween and an rubber elastic body interposed between and elastically connecting the inner and outer metal sleeves. For instance, this cylindrical vibration-isolating device may be used in an automotive vehicle as a member mount such as a suspension member, a deferential mount, a body mount, a suspension bush or the like.

Generally, the cylindrical vibration-isolating device is installed between one and the other members of the vibration system such that the inner metal sleeve is fixed to the one member by a mounting bolt or rod fixedly formed in the one member and extending through the bore of the inner metal sleeve, while the outer metal sleeve is forcedly pressed into a fixing bore formed in the other member. In this condition, the inner metal sleeve is fastened in its axial direction between the one member and a washer, which are held in pressing contact with opposite axial end faces of the inner metal sleeve, respectively. Therefore, water is likely to enter into the bore of the inner metal sleeve through a gap between the one member or washer and the corresponding end face of the inner metal sleeve, thus causing rust of the device and resultant deterioration of strength or durability of the device.

To cope with this problem, it has been proposed to provide a thin sealing rubber layer on at least the one end face of the inner metal sleeve which is held in contact with the one member, so that the sealing rubber layer is compressed by and between the one end face of the inner metal sleeve and the one member.

However, the sealing rubber layer compressed by and between the end face of the inner metal sleeve and the one member is prone to suffer from fatigue or wear thereof due to a load and sliding frictional force continuously applied thereto. This leads to early deterioration of sealing capability of the sealing rubber layer. It is therefore difficult to ensure a fluid-tight sealing between the end face of the inner metal sleeve and the one member for a long period of time.

Examples of various types of known sealing members for the cylindrical vibration-isolating device are disclosed in JP-U-57-165827. A first example is a sealing projection which is integrally formed on one of axially opposite end faces of the elastic body. A second example is a sealing projection which is independent of the elastic body, and is formed on and protrudes outwardly from an outer circumferential surface of one of axially opposite end portions of the inner metal sleeve. In the first example, since the sealing projection is integrally formed with the elastic body, the sealing projection is affected by elastic deformation of the elastic body. Thus, the sealing projection of the first example is incapable of exhibiting a stable sealing capability. In the second example, since the sealing projection is formed independently of the elastic body, molding of the sealing projection and the elastic body becomes cumbersome. Further, the sealing projection of the second example is likely to suffer from stress concentration at a bonding surface thereof to the inner metal sleeve, thus causing occurrence of cracks in the sealing projection and separation in the interface between the sealing projection and the inner metal sleeve. Thus, the sealing projection of the second example is insufficient in terms of durability.

SUMMARY OF THE INVENTION

It is therefore an object of the present invention to provide a cylindrical vibration-isolating device which includes a novel sealing structure capable of preventing entrance of water into a bore of an inner metal sleeve with high stability for a long period of time.

The above object may be attained according to the following modes of the invention, each of which is numbered like the appended claims and depends from the other mode or modes, where appropriate, to indicate possible combinations of elements or technical features of the invention. It is to be understood that the present invention is not limited to the following modes or combinations of technical features, but may otherwise be recognized based on the thought of the present invention that described in the whole specification and drawings or that may be recognized by those skilled in the art in the light of the disclosure in the whole specification and drawings.

(1) A cylindrical vibration-isolating device comprising: (a) an inner metal sleeve; (b) an outer metal sleeve disposed radially outwardly of the inner metal sleeve with a radial spacing therebetween; (c) an elastic body interposed between and elastically connecting the inner metal sleeve and the outer metal sleeve, such that at least one of axially opposite end portions of the inner metal sleeve is located axially outward of the elastic body; (d) a connecting rubber layer integrally formed with and protruding axially outwardly from the elastic body, said connecting rubber layer having a thin-walled cylindrical shape and being secured to an outer circumferential surface of the at least one of axially opposite end portions of the inner metal sleeve; and (e) an annular sealing-rubber member formed integrally with and protruding axially outwardly from a protruding end portion of the connecting rubber layer, the annular sealing-rubber member protruding axially outwardly from a corresponding end face of the inner metal sleeve, the annular sealing-rubber member having a radially inner base portion which has a concave surface and rises from a first axial position on the outer circumferential surface of the at least one of axially opposite end portions of said inner metal sleeve, which first axial position is axially inwardly spaced apart from the corresponding end face of the inner metal sleeve.

In the vibration-isolating device according to the above mode (1) of the invention, the annular sealing-rubber member, which is provided on the outer circumferential surface of the at least one of axially opposite end portions of the inner metal sleeve which is located axially outward of the elastic body, is integrally connected and formed with the elastic body via the connecting rubber layer which is secured to the outer circumferential surface of the at least one of axially opposite end portion of the inner metal sleeve. According to this structure, the annular sealing-rubber member can be simultaneously formed with the elastic body with ease and firmly secured to the inner metal sleeve. Further, the presence of the connecting rubber, which is thin and secured to the outer circumferential surface of the inner metal sleeve, is effective to prevent undesirable transmission of the stress between the elastic body and the annular sealing-rubber member. Accordingly, the present vibration-isolating device is capable of exhibiting both of excellent vibration-isolating characteristics owing to the elastic body and excellent sealing capability owing to the annular sealing-rubber member, with high stability. In this respect, the annular sealing-rubber member protrudes axially outwardly from the corresponding end face of the inner metal sleeve, so that, when the vibration-isolating device is installed between two members of a vibration system, the annular sealing-rubber member is held in pressing contact with one of the two members at a portion radially outward of the inner metal sleeve. This ensures an excellent fluid-tight sealing between the one member and the corresponding end face of the inner metal sleeve.

Further, the radially inner base portion of the annular sealing-rubber member is located axially inward of the corresponding end face of the inner metal sleeve. That is, upon vulcanization of a rubber material for forming the annular sealing-rubber member by using a mold, an annular boundary between the mold and the inner metal sleeve is located at the first axial position on the outer circumferential surface of the at least one of the axially opposite end portions of the inner metal sleeve, which first axial position is axially inwardly retracted or spaced apart from the corresponding end face of the inner metal sleeve. This arrangement is effective to prevent a leakage of the rubber material through the annular boundary to the corresponding end face of the inner metal sleeve. Namely, when a rubber layer is formed on the end face of the inner metal sleeve, the rubber layer is likely to be fatigued or wore due to a load or sliding frictional force which act on the rubber layer when the vibration-isolating device is installed in position between the two member of the vibration system. The fatigue or wear of the rubber layer is prone to cause occurrence of undesirable looseness or gap between the inner metal sleeve and one of the two members to which the inner metal sleeve is fixed. According to the present mode of the invention, however, such an undesirable formation of the rubber layer on the end face of the inner sleeve member is effectively prevented, in other words, the cause of the above-indicated drawbacks is eliminated, thus ensuring a stable sealing capability and a stable installation condition of the vibration-isolating device for a long period of time.

In addition, the radially inner base portion of the annular sealing-rubber member has the generally concave surface. This arrangement is effective to minimize local stress concentration at the bonding interface between the inner metal sleeve and the annular sealing-rubber member, thus preventing occurrence of cracks in the annular sealing-rubber member and separation in the interface between the annular sealing-rubber member and the inner metal sleeve. This arrangement is also effective to ensure strength or durability of a portion of the mold by which the radially inner base portion of the annular sealing-rubber member is defined.

(2) A cylindrical vibration-isolating device according to the above-indicated mode (1), wherein the radially inner base portion of the annular sealing-rubber member rises from the first axial position which is axially inwardly spaced apart from the corresponding end face of the inner metal sleeve by a distance within a range of 0.5 mm–2.0 mm.

In this mode (2), when a rubber material is vulcanized within a predetermined mold for forming the annular sealing-rubber member, a leakage of the rubber material through the boundary between the mold and the inner metal sleeve toward the corresponding end face of the inner metal sleeve is surely prevented, while ensuring strength and durability of a portion of the mold, which portion defines the radially inner base portion of the annular sealing-rubber member.

(3) A cylindrical vibration-isolating device according to the above-indicated mode (1) or (2), wherein the generally concave surface of the radially inner base portion of the annular sealing-rubber member has a radius of curvature which is not smaller than 0.5 mm but not larger than a dimension corresponding to a half of a thickness of the connecting rubber layer.

This arrangement of the mode (3) is further effective to prevent or minimize buckling-like deformation of the annular sealing-rubber member caused by stress concentration at or a load application to the base portion of the annular sealing-rubber member, thus ensuring further improved durability and stability of a sealing capability of the annular sealing-rubber member.

(4) A cylindrical vibration-isolating device according to any one of the above-indicated modes (1)–(3), wherein at least one of an inner and an outer diameter of the annular sealing-rubber member is gradually increased in an axially outward direction toward a protruding end thereof.

This arrangement of the mode (4) is effective to minimize compression stress generated in the annular sealing-rubber member when the vibration-isolating device is installed in position and the protruding end portion of the annular sealing-rubber member is held in pressing contact with the one of two members of the vibration system. This facilitates shear deformation of the annular sealing-rubber member, thus minimizing a possibility of fatigue of the annular sealing-rubber member and resultant decrease in the pressing force of the annular sealing-rubber member acting on the one member. This results in an improved durability of the annular sealing-rubber member.

(5) A cylindrical vibration-isolating device according to any one of the above-indicated modes (1)–(4), wherein the annular sealing rubber has an outer diameter gradually increased in an axially outward direction from a second axial position located axially inward of the first axial position toward a protruding end thereof.

According to this mode (5), a wall thickness of the annular sealing-rubber member is sufficiently increased especially at the base portion of the annular sealing-rubber member, thus minimizing stress concentration at the base portion of the annular sealing-rubber member and improving durability of the annular sealing-rubber member. In this case, a mold for forming the annular sealing-rubber member has a tapered portion that is tapered in a direction in which the obtained annular sealing-rubber member is removed from the mold, thus improving mold-release characteristics.

(6) A cylindrical vibration-isolating device according to any one of the above-indicated modes (1)–(5), wherein the annular sealing-rubber member has a wall-thickness gradually decreased toward a protruding end thereof.

While the base portion of the annular sealing-rubber member is likely to suffer from a problem of local stress concentration, this arrangement of the mode (6) is effective to prevent occurrence of cracks in the base portion of the annular sealing-rubber member and separation in the interface between the inner metal sleeve and the annular sealing-rubber member, thereby further improving durability of the annular sealing-rubber member. In addition, the arrangement of the mode (6) ensures a low spring stiffness of the protruding end portion of the annular sealing-rubber member, so that the protruding end portion of the annular sealing-rubber member is likely to be deformed along the shape of the mounting member, resulting in further stability of sealing capability of the annular sealing-rubber member.

(7) A cylindrical vibration-isolating device according to any one of the above-indicated modes (1)–(6), wherein the corresponding end face of the inner metal sleeve which is surrounded by the annular sealing-rubber member, is formed as a flat annular surface.

According to this mode (7), the inner metal sleeve can be firmly and stably fixed to the one member of the vibration system. This is effective to further improve sealing capability of the annular sealing-rubber member.

(8) A cylindrical vibration-isolating device according to any one of the above-indicated modes (1)–(7), wherein the annular sealing-rubber member is provided only at one of axially opposite end portions of the inner metal sleeve.

In the mode (8) of the invention, the annular sealing-rubber member is provided only one of the axially opposite end portions of the inner metal sleeve. Therefore, the inner metal sleeve may further be provided with a structure for draining water entered the bore thereof from the other end portion thereof. It is noted that the annular sealing-rubber members may possibly be provided at the both end portions of the inner metal sleeve for preventing entrance of water into the bore of the inner metal sleeve from the both ends of the inner metal sleeve. In this case, namely, the both end of the inner metal sleeve are completely sealed by the annular sealing-rubber members. Therefore, the inner metal sleeve may possibly suffer from adverse effect of a negative pressure generated within the bore of the inner metal sleeve due to a change of the ambient temperature. On the other hand, the vibration-isolating device constructed according to this mode (8) is free from such a drawback caused by a generation of the negative pressure within the bore of the inner metal sleeve.

(9) A cylindrical vibration-isolating device according to the above-indicated mode (8), wherein the device is installed in position such that the one of axially opposite end portions of the inner metal sleeve is located above of the other end portion of the inner metal sleeve in a vertical direction.

In this mode (9), entrance of water into the bore of the inner metal sleeve is effectively prevented owing to effect of gravity. Once the water is entered into the bore of the inner metal sleeve, the water can be easily discharged from the bore of the inner metal sleeve, owing to effect of gravity, too.

BRIEF DESCRIPTION OF THE DRAWINGS

The above and other objects, features advantages and technical and industrial significance of the present invention will be better understood by reading the following detailed description of the present preferred embodiments of the invention when considered in connection with the accompanying drawings in which.

DETAILED DESCRIPTION OF THE PREFERRED EMBODIMENT

Figure 1:
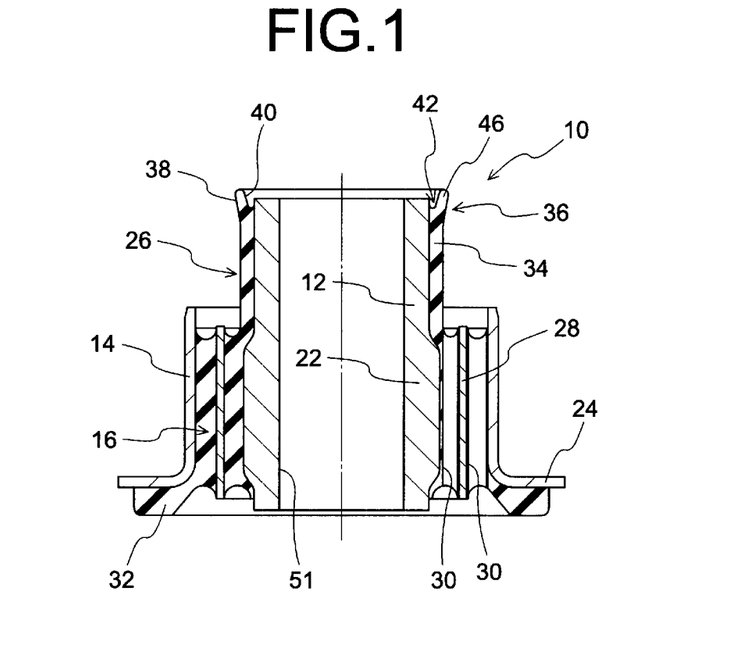
FIG. 1 is an elevational view in axial cross section of one embodiment of a cylindrical vibration-isolating device of the invention in the form of a suspension member mount, the view being taken along line 1—1 of FIG. 2.
Figure 2:
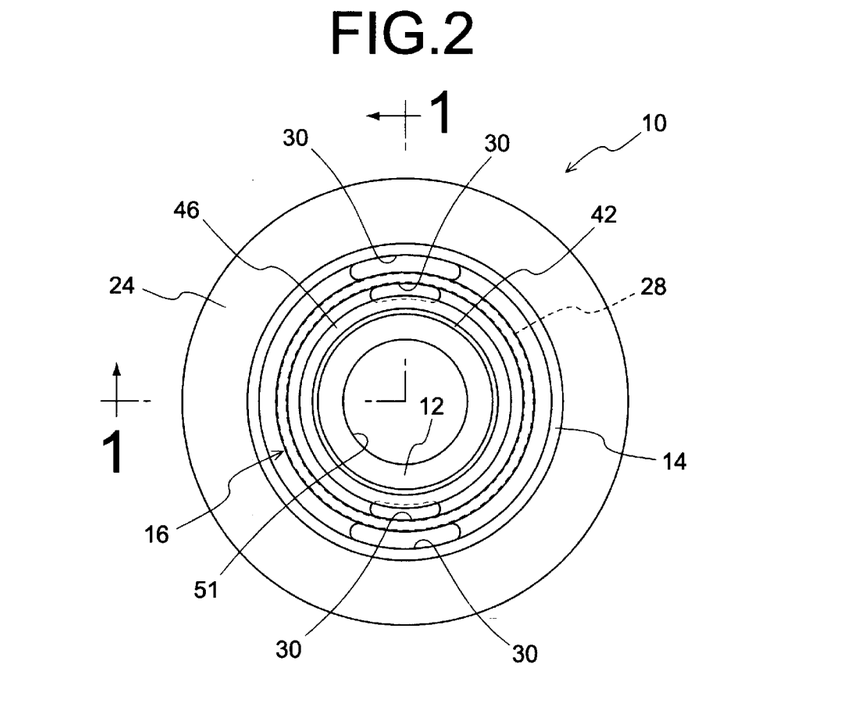
FIG. 2 is a plane view of the member mount of FIG. 1.

Referring first to FIGS. 1 and 2, there are shown a cylindrical vibration-isolating device in the form of a suspension member mount 10 for a motor vehicle, which is constructed according to one embodiment of the invention. The member mount 10 includes an inner metal sleeve 12 and an outer metal sleeve 14, which are disposed in a radially spaced apart relation with each other with a suitable radial distance therebetween. An elastic body 16 made of a rubber material is interposed between and elastically connecting the inner and outer metal sleeves 12, 14. As is apparent from FIG. 3, the member mount 10 is installed on the motor vehicle such that the inner metal sleeve 12 is attached to a body 18 of the vehicle while the outer metal sleeve 14 is attached to a suspension member 20 of the vehicle. With the member mount 10 thus installed on the vehicle, the suspension member 20 is supported by the body 18 of the vehicle in a vibration-isolating fashion. In the following description, the words "upper" and "lower" or "upward" and "downward" will be used to represent vertically upper and lower positions or directions of the components or parts in the member mount 10 as viewed in FIGS. 1 and 3.

Described more specifically, the inner metal sleeve 12 is a small-diameter thick-walled cylindrical member, which is made of a rigid metallic material such as steel, an aluminum alloy and the like. The inner metal sleeve 12 has a large-diameter portion 22 integrally formed at an axially lower part of an intermediate portion thereof. The large-diameter portion 22 extends over a predetermined axial length corresponding to approximately a half of an axial length of the inner metal sleeve 12.

The outer metal sleeve 14 is a large-diameter thin-walled cylindrical member, which is made of a rigid metallic material such as steel, an aluminum alloy and the like, like the inner metal sleeve 12. The outer metal sleeve 14 has an axial length corresponding to a half of the axial length of the inner metal sleeve 12. The outer metal sleeve 14 has a flange portion 24 which is integrally formed at an axially lower end portion of the outer metal sleeve 14, so as to extend radially outwardly from the axially lower end portion of the outer metal sleeve 14. The thus formed outer metal sleeve 14 is disposed radially outwardly of the inner metal sleeve 12 with a radial spacing therebetween such that the outer metal sleeve 14 is held in coaxial relationship with the inner metal sleeve 12 and is located over the large diameter portion 22 of the inner metal sleeve 12.

The elastic body 16 is interposed between the inner and outer metal sleeves 12, 14, for elastically connecting these inner and outer metal sleeves 12, 14 with each other. The elastic body 16 has a thick-walled hollow cylindrical shape in its entirety. Upon vulcanization of a rubber material for forming the elastic body 16, the elastic body 16 is bonded at its inner circumferential surface to the large-diameter portion 22 of the inner metal sleeve 12, while being bonded at its outer circumferential surface to the outer metal sleeve 14. That is, the inner and outer metal sleeves 12, 14 and the elastic body 16 cooperate to provide an integral vulcanized assembly 26.

The member mount 10 further includes a thin-walled cylindrical intermediate sleeve 28 continuously extending in its circumferential direction over its entire circumference. The intermediate sleeve 28 is interposed between the inner and outer metal sleeves 12, 14 such that the intermediate sleeve 28 is held in coaxial relationship with the inner and outer metal sleeves 12, 14 and is radially spaced apart from the inner and outer metal sleeves 12, 14. The intermediate sleeve 28 extends through a radially intermediate portion of the elastic body 16 in its axial direction such that the elastic body 16 is bonded by vulcanization to the inner and outer circumferential surfaces of the intermediate sleeve 28. That is, the intermediate sleeve 28 is provided to adjust a ratio of spring constants of the elastic body 16 and the member mount 10 in the axial direction and a radial direction perpendicular to the axial direction. In the present embodiment, spring characteristics of the elastic body 16 and the member mount 10 in the radial direction are made harder than those in the axial direction, for example.

The elastic body 16 includes a pair of void in the form of a pair of slits 30, 30 formed therethrough in the axial direction at respective circumferential portions thereof. These circumferential portions are opposed to each other in one radial direction perpendicular to the axial direction of the inner metal sleeve 12. These slits 30, 30 function to adjust the spring ratio of the elastic body 16 or the member mount 10 in the radial direction. Namely, the spring stiffness of the elastic body 16 or the member mount 10 in the one radial direction in which the slits 30, 30 are opposed to each other is made lower than that in another radial direction perpendicular to the one radial direction. It the present embodiment, the intermediate sleeve 28 extends through the radially intermediate portion of each of the slits 30, 30 in the axial direction.

A rubber buffer 32 is formed over the entire circumference of the flange portion 24 of the outer metal sleeve 14 such that the rubber buffer 32 extends in the axially outward (downward as seen in FIG. 1) direction from the flange portion 24. In the present embodiment, the elastic body 16 extends to the flange portion 24 so that the elastic body 16 and the rubber buffer 32 are formed integrally with each other.

On the other hand, an axially upper end portion of the inner metal sleeve 12, as at least one axial end portion of the metal sleeve is located axially upward of the large-diameter portion 22 as seen in FIG. 1, and protrudes axially outwardly (upwardly as seen in FIG. 1) from the elastic body 16 by a relatively large axial distance. In the present embodiment, the axially upper end portion of the inner metal sleeve 12 protrudes axially outwardly from the corresponding axial end face of the elastic body 16 by an axial distance of not smaller than 5.0 mm, preferably not smaller than 10.0 mm, more preferably not smaller than 15.0 mm. An outer circumferential surface of the axially upper end portion of the inner metal sleeve 12 is substantially entirely covered by a connecting rubber layer 34 which is integrally formed with the elastic body 16, and which is bonded and secured vulcanization to the outer circumferential surface of the axially upper end portion of the inner metal sleeve 12. In the present embodiment, the connecting rubber layer 34 is dimensioned to have a wall thickness within a range of 0.5 mm–5.0 mm, preferably 1.0 mm–3.0 mm, by way of example.

The connecting rubber layer 34 is arranged to form at its protruding end portion an annular sealing-rubber member 36 which extends over the entire circumference of the inner metals sleeve 12 and protrude outwardly from the outer circumferential surface of the axially upper end portion of the inner metal sleeve 12. As is understood from FIG. 4, the annular sealing-rubber member 36 has a radially inner base portion 42 which rises from a first axial position on the outer circumferential surface of the axially upper end portion of the inner metal sleeve 12, which first axial position is axially inwardly spaced apart from the corresponding end face of the inner metal sleeve 12 by a first predetermined distance: La (i.e., three-fourths of the wall-thickness of the connecting rubber layer 34). The annular sealing-rubber member 36 protrudes axially outwardly from the corresponding end face of the inner metal sleeve 12 by a second predetermined distance: Lb. In the present embodiment, the first predetermined distance: La is dimensioned to be held within a range of 0.5 mm–4.0 mm, more preferably 1.0 mm–3.0 mm, while the second predetermined distance: Lb is dimensioned to be held within a range of 0.1 mm–4.0 mm, more preferably 0.5 mm–2.0 mm. The first and second predetermined distances: La, Lb may be dimensioned to be substantially equal to each other, preferably.

The annular sealing-rubber member 36 has an outer circumferential surface 38 whose diameter is gradually increased in the axially outward direction from a second axial position which is axially inwardly spaced apart from the first axial position, and which is axially inwardly spaced apart from the corresponding end face of the inner metal sleeve 12 by a third predetermined distance: Lc corresponding to a distance approximately three times the wall thickness of the connecting rubber layer 34. In the present embodiment, the third predetermined axial distance: Lc is dimensioned to be held within a range of 1.0 mm–15.0 mm, more preferably 1.5 mm–10.0 mm, for example, so that the inequality of Lc>La is satisfied. The annular sealing-rubber member 36 also has an inner circumferential surface 40 whose diameter is gradually increased in the axially outward direction from the radially inner base portion 42 thereof to the protruding end portion thereof. That is, the inner and outer circumferential surfaces 38, 40 are both formed as radially outwardly inclined cylindrical surfaces whose diameters increased towards their protruding end portions. In other words, the annular sealing-rubber member 36 is formed as an inverted-tapered cylindrical member which protrudes axially outwardly and radially outwardly from the outer circumferential surface of the inner metal sleeve 12.

In the present embodiment, the outer circumferential surface 38 of the annular sealing-rubber member 36 has an inclined angle which is slightly smaller than that of the inner circumferential surface 40. In this arrangement, the wall-thickness of the annular sealing-rubber member 36 is gradually decreased toward the protruding end thereof in the axially outward direction, i.e., in the axially upward direction as seen in FIG. 1.

Figure 4:
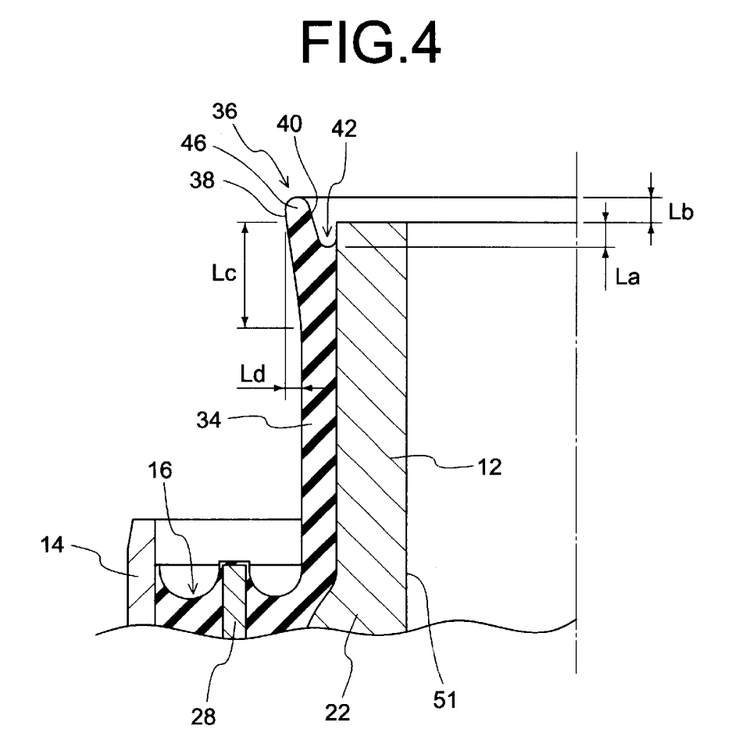
FIG. 4 is a fragmental enlarged view in axial cross section of the suspension member mount of FIG. 1.

As shown in FIG. 4, the annular sealing-rubber member 36 protrudes radially outwardly from the outer circumferential surface of the connecting rubber layer 34 by a radial distance: Ld which corresponds to approximately a half of the wall-thickness of the connecting rubber layer 34. In the present embodiment, the radial distance: Ld is dimensioned to be held within a range of 0.3 mm–2.5 mm, more preferably within a range of 0.5 mm–1.5 mm.

As is understood from the foregoing description, the annular sealing-rubber member 36 has the radially inner base portion 42 which has a generally concave shape as seen in axial cross section, and has an annular protruding end portion 46 which has a generally arcuate shape as seen in axial cross section. The annular sealing-rubber member 36 circumferentially extends over the entire circumference of the inner metal sleeve 12 with a constant cross sectional area. Further, the annular sealing-rubber member 36 is spaced apart from the elastic body 16 by the axial distance corresponding to the axial length of the connecting rubber layer 34 interposed therebetween, while being integrally formed with the elastic body 16 via the connecting rubber layer 34. It should be noted that the radially inner base portion 42 has a radius of curvature of not smaller than 0.5 mm but not larger than a dimension of the wall-thickness of the connecting rubber layer 34, more preferably a half of the wall-thickness of the connecting rubber layer 34.

Figure 3:
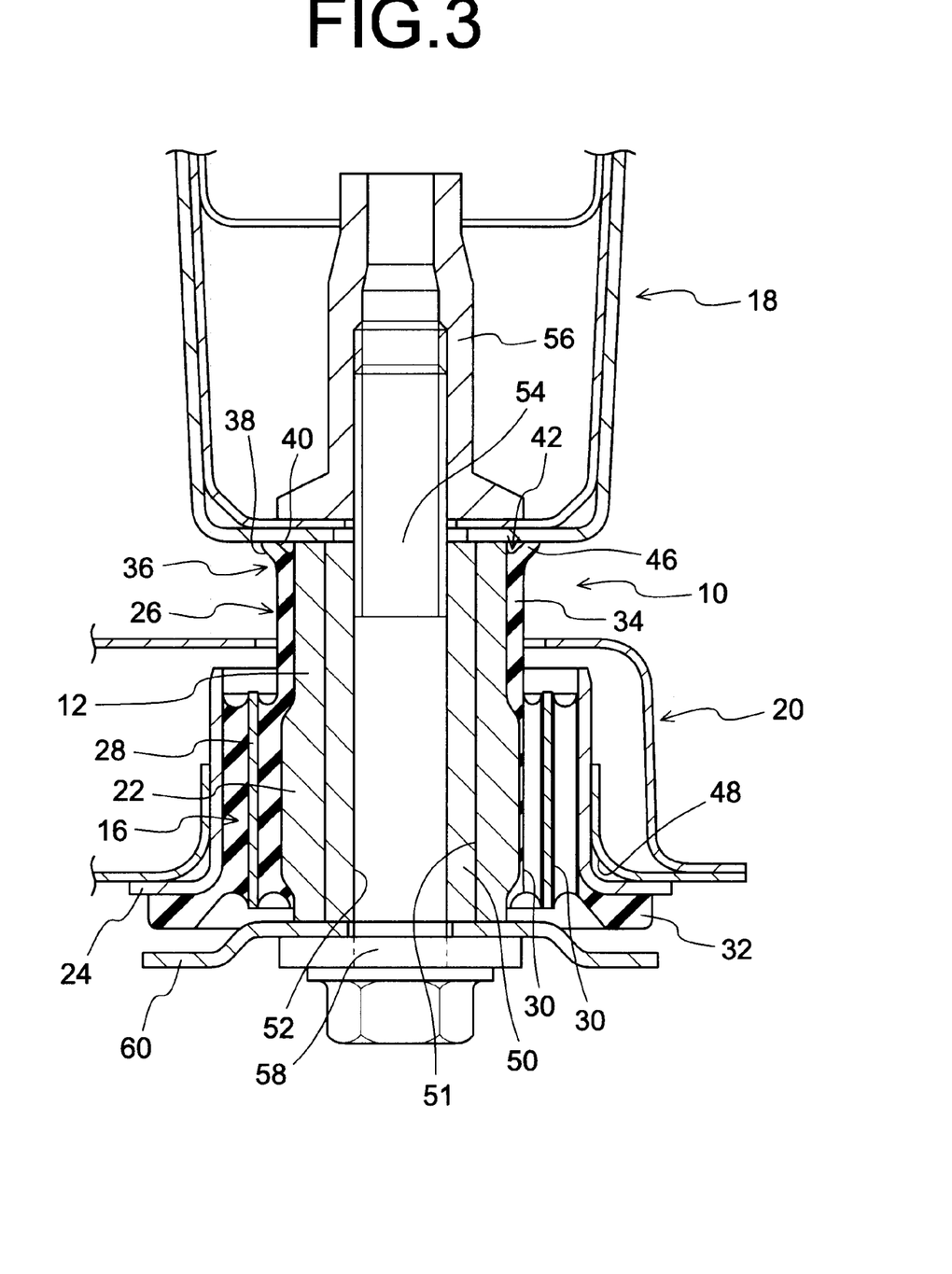
FIG. 3 is an elevational view in axial cross section of the suspension member mount of FIG. 1, which is installed in position.

The suspension member mount 10 constructed as described above is installed on the vehicle as shown in FIG. 3. Namely, the outer metal sleeve 14 is press fitted into a fixing bore 48 of a suspension member 20, while the inner metal sleeve 12 is bolted to the body 18 of the vehicle such that a mounting bolt 54 is inserted through an insert sleeve 50 inserted within a bore 51 of the inner metal sleeve 12 and screwed into a nut 56 fixedly formed in the body 18 of the vehicle. With the member mount 10 installed between the body 18 and the suspension member 20, the suspension member 20 is supported by the body 18 of the vehicle in a vibration-isolating fashion.

With the member mount 10 installed in position as show in FIG. 3, a stop plate 60 and a washer 58 is radially outwardly disposed on the mounting bolt 54 and fastened by and between a head of the mounting bolt 54 and the axially lower end face of the inner metal sleeve 12. The stop plate 60 is an annular thin-plate member and has a shoulder at its radially intermediate portion, so that an outer peripheral portion of the stop plate 60 is located axially outward (downward as seen in FIG. 3) of the flange portion 24 of the outer metal sleeve 14, while being opposed to the rubber buffer 32 with an axial spacing therebetween. Upon application of an excessively large vibrational load to the member mount 10, the stop plate 60 is brought into elastic contact with the flange portion 24 via the rubber buffer 32, for thereby limiting the amount of axial relative displacement of the inner and outer metal sleeves 12, 14, in other words, the amount of axial relative displacement of the body 18 of the vehicle and the suspension member 20.

In this respect, it is noted that the inner metal sleeve 12 is fixedly fastened in its axial direction by and between the body 18 of the vehicle and the stop plate 60 fixed to the mounting bolt 54, such that the axially opposite end faces of the inner metal sleeve 12 are forcedly held in contact with surfaces of the body 18 and the stop plate 60, respectively.

Figure 5:
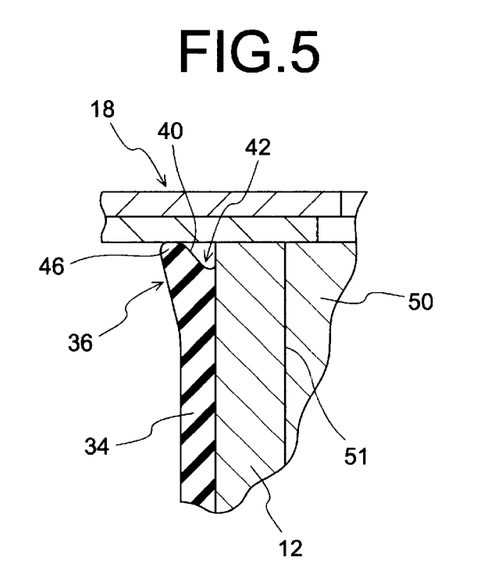
FIG. 5 is a fragmental enlarged view in axial cross section of the suspension member mount of FIG. 3.

With the member mount 10 installed in position, the annular protruding end portion 46 of the annular sealing-rubber member 36 is held in pressing contact with the body 18 of the vehicle at a portion located radially outward of the inner metal sleeve 12. FIG. 5 shows a state of the annular sealing-rubber member 36 in which the annular sealing-rubber member 36 is deformed by a compression force applied thereto. Described more specifically, the radially inner base portion 42 of the annular sealing-rubber member 36 is secured to the outer circumferential surface of the inner metal sleeve 12, while the annular protruding end portion 46 of the annular sealing-rubber member 36 is held in pressing contact with the portion of the body 18, whereby the overall annular sealing-rubber member 36 is elastically deformed. In this condition, the annular protruding end portion 46 is able to be deformed along the configuration of the portion of the body 18 of the vehicle owing to the elastic deformation of the annular sealing-rubber member 36, thus ensuring a hermetical or fluid-tight sealing at the interface between the body 18 of the vehicle and the annular protruding end portion 46 of the annular sealing-rubber member 36.

In the member mount 10 constructed according to the present embodiment, therefore, an abutting or connecting portion between one axial end face (i.e., the axially upper end face as seen in FIG. 3) of the inner metal sleeve 12 and the body 18 of the vehicle is hermetically sealed substantially completely so as to prevent entrance or ingress of water, dust or the like from the external area into the inside of the annular sealing-rubber member 36 and the bore 51 of the inner metal sleeve 12. Therefore, the member mount 10 can exhibit an excellent vibration-isolating effect. It is noted that the end face of the inner metal sleeve 12 is formed as a flat annular surface, so that the inner metal sleeve may be firmly and stably fixed to the body 18, resulting in an improved sealing capability of the annular sealing-rubber member 36.

In particular, the radially inner base portion 42 of the annular sealing-rubber member 36 has the concave surface, thereby minimizing stress concentration generated at the interface between the outer circumferential surface of the inner metal sleeve 12 and the radially inner base portion 42. Thus, the annular sealing-rubber member 36 exhibits an excellent durability thereof. Further, the annular sealing-rubber member 36 is sufficiently spaced apart from the elastic body 16 and independent of the elastic body 16 in terms of stress. Accordingly, the annular sealing-rubber member 36 can exhibit a desired sealing capability, without being affected by the elastic deformation of the elastic body 16 upon application of vibrational load to the elastic body 16.

In the present embodiment, the annular sealing-rubber member 36 is provided only at one axial end portion (e.g., the axially upper end portion of the inner metal sleeve 12) in the present embodiment. Therefore, the other end portion (e.g., the axially lower end portion of the inner metal sleeve 12 in the present embodiment) can be utilized for forming a suitable drain mechanism which permits drain of water or other objects entered inside of the inner metal sleeve 12. In addition, the axially lower end portion of the inner metal sleeve 12 does not sealed, thus avoiding occurrence of negative pressure within the bore 51 of the inner metal sleeve 12 and adverse effect of the negative pressure on vibration-isolating characteristics of the member mount 10.

In this respect, since the annular sealing rubber 36 is provided at the axially upper end portion of the inner metal sleeve 12, the entered water or the like can be easily discharged from any suitable portion of the inner metal sleeve 12 locate axially downward of the annular sealing rubber 36, owing to gravity acting on the water or the like.

While the present invention has been described in its presently preferred embodiment for illustrative purpose only, it is to be understood that the invention is not limited to the details of the illustrated embodiment, but may otherwise be embodied.

For instance, the intermediate sleeve 28 and the pair of slits 30, 30 formed through the elastic body 16 are not essential in practicing the present invention, and can be eliminated depending upon required damping characteristics. While the intermediate sleeve 28 extends over the entire circumference of the elastic body 16 in the illustrated embodiment, the intermediate sleeve 28 may consist of a plurality of members arranged in the circumferential direction. Further, while the pair of slits 30, 30 extend through the elastic body 16 in the axial direction in the illustrated embodiment, the configuration of the slits 30 is not limited to that in the illustrated embodiment. The slit 30 may not extend through the elastic body 16 at one of its axially opposite ends, for example.

The specific configuration and structure of the annular sealing-rubber member 36 including the shape of the radially inner base portion 42 and the shape of the annular protruding end portion 46 are not particularly limited to the illustrated embodiment, but may otherwise be modified or changed depending upon a configuration of a member to which the inner metal sleeve 12 of the vibration-isolating device is fixed.

Figure 6:
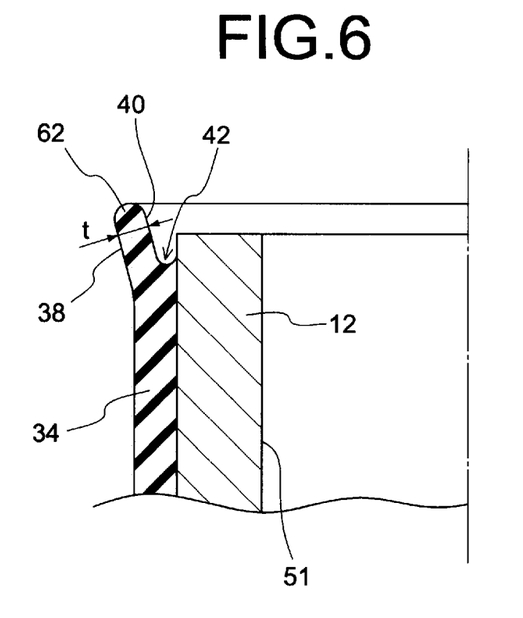
FIG. 6 is a fragmental enlarged view in axial cross section of another embodiment of a cylindrical vibration-isolating device of the invention in the form of a suspension member mount.
Figure 7:
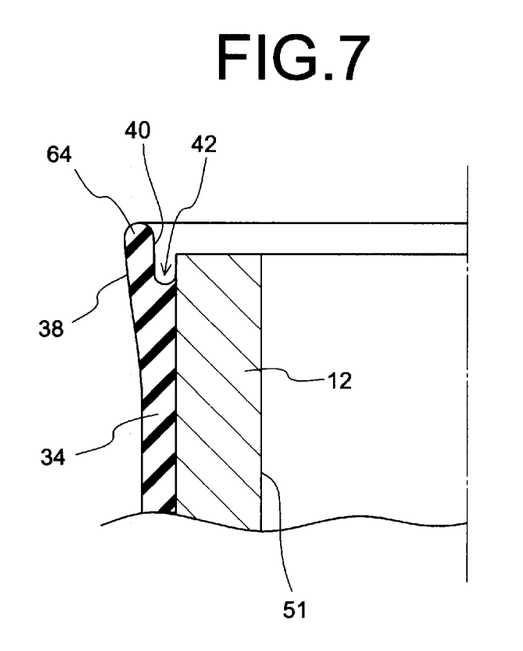
FIG. 7 is a fragmental enlarged view in axial cross section of yet another embodiment of a cylindrical vibration-isolating device of the invention in the form of a suspension member mount.
Figure 8:
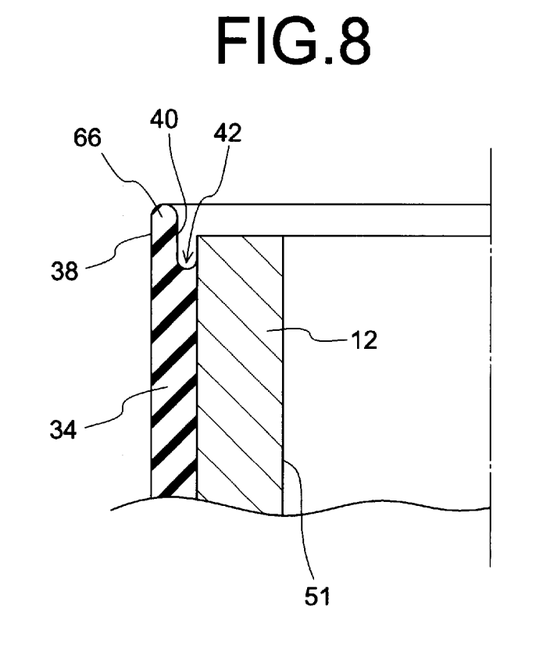
FIG. 8 is a fragmental enlarged view in axial cross section of still another embodiment of a cylindrical vibration-isolating device of the invention in the form of a suspension member mount.
Figure 9:
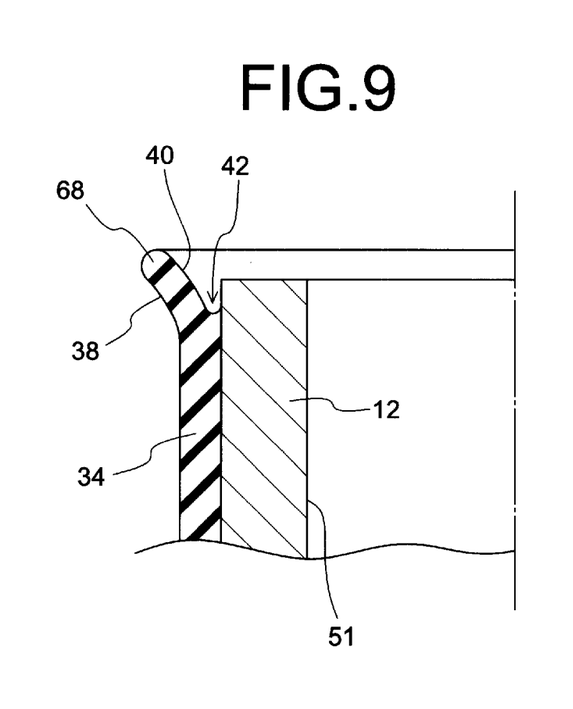
FIG. 9 is a fragmental enlarged view in axial cross section of yet still another embodiment of a cylindrical vibration-isolating device of the invention in the form of a suspension member mount.

Referring next to FIGS. 6–10, there are shown modifications of the annular sealing-rubber member 36 of member mounts constructed according to other preferred embodiments. Described in detail, FIG. 6 shows an annular sealing-rubber member 62 in which the outer and inner circumferential surfaces 38, 40 are axially outwardly inclined by the same angle with respect to the axis of the inner metal sleeve 12 so that the annular sealing-rubber member 62 extends axially outwardly with a substantially constant wall thickness: t. FIG. 7 shows an annular sealing-rubber member 64 in which the outer circumferential surface 38 extends axially outwardly with a slight inclined angle, while the inner circumferential surface 40 extend straightly in the axially outward direction. FIG. 8 shows an annular sealing-rubber member 66 in which both of the outer and inner circumferential surfaces 38, 40 extend parallel to an axis of the inner sleeve member, in other words, extend straightly in the axially outward direction. FIG. 9 shows an annular sealing-rubber member 68 in which both of the outer and inner circumferential surfaces 38, 40 are formed as outwardly curved surfaces or outwardly convex surfaces extending axially outwardly and radially outwardly.

It should be appreciated that the principle of the present invention is also applicable to a fluid-filled cylindrical damping device such as a fluid-filled member mount. As disclosed in JP-U-62-025348 and JP-U-62-050344, for example, a known fluid-filled cylindrical damping device includes therein a fluid chamber filled with a non-compressible fluid, and is adapted to exhibit a high vibration damping effect based on flows of the fluid within the fluid chamber generated upon application of the vibrational load to the device.

In the illustrated embodiment, the stop plate 60 is located axially downward of the member mount 10, with the member mount 10 is installed in position. The stop plate 60 is not essential to practice the present invention, and can be eliminated depending upon vibration characteristics required for the vibration-isolating device. In this respect, the size and configuration of the rubber buffer 32 secured to the flange portion 24 of the outer metal sleeve 14 are not particularly limited to the illustrated embodiment, but may be desirably modified or changed.

The concept of the present invention is applicable to not only automotive-vehicle member mounts but also automotive-vehicle body mounts, and differential mounts, and additionally to various cylindrical damping devices which are employed in other structures than automotive vehicles.

It is to be understood that the present invention may be embodied with various other changes, modifications, and improvement which may occur to those skilled in the art, without departing from the spirit and scope of the invention defined in the following claims:

What is claimed is:

1. A cylindrical vibration-isolating device comprising:
   an inner metal sleeve;
   an outer metal sleeve disposed radially outwardly of said inner metal sleeve with a radial spacing therebetween;
   an elastic body interposed between and elastically connecting said inner metal sleeve and said outer metal sleeve, such that at least one of axially opposite end portions of said inner metal sleeve is located axially outward of said elastic body;
   a connecting rubber layer integrally formed with and protruding axially outwardly from said elastic body, said connecting rubber layer having a thin-walled cylindrical shape and being secured to an outer circumferential surface of said at least one of axially opposite end portions of said inner metal sleeve; and
   an annular sealing-rubber member formed integrally with said connecting rubber layer and protruding axially outwardly from a corresponding end face of said inner metal sleeve,
   wherein said annular sealing-rubber member includes a radially inner base portion that rises from a first axial position on said outer circumferential surface of said at least one of axially opposite end portions of said inner metal sleeve, the first axial position being axially inwardly spaced apart from said corresponding end face inner metal sleeve,
   wherein at least one of an inner diameter and an outer diameter of said annular sealing-rubber member gradually increases in an axially outward direction toward a protruding end thereof,
   wherein said outer diameter of said annular sealing rubber member gradually increases in the axially outward direction from a second axial position located axially inwardly of the first axial position, toward said protruding end so that said annular sealing rubber member is adopted deform radially outwardly to minimize fatiguing, and decrease the compressive force acting thereon.

2. A cylindrical vibration-isolating device according to claim 1, wherein said radially inner base portion of said annular sealing-rubber member rises from said first axial position which is axially inwardly spaced apart from said corresponding end face of said inner metal sleeve by a distance within a range of 0.5 mm–2.0 mm.

3. A cylindrical vibration-isolating device according to claim 2, wherein said radially inner base portion of said annular sealing-rubber member protrudes from the first axial position which is axially inwardly spaced apart from said corresponding end face of said inner metal sleeve by a first distance: La within a range of 0.5 mm–4.0 mm, while said annular sealing-rubber member protrudes axially outwardly from said corresponding end face of said inner metal sleeve by an second distance: Lb within a range of 0.1 mm–4.0 mm.

4. A cylindrical vibration-isolating device according to claim 3, wherein said second axial position is axially inwardly spaced apart from said corresponding end face of said inner metal sleeve by a third distance: Lc, which is within a range of 1.0 mm–15.0 mm, said third distance: Lc being larger than said first distance: La.

5. A cylindrical vibration-isolating device according to claim 1, wherein said radially inner base portion of said annular sealing-rubber member has a concave surface having a radius of curvature not smaller than 0.5 mm but not larger than a dimension corresponding to a half of a thickness of said connecting rubber layer.

6. A cylindrical vibration-isolating device according to claim 1, wherein said annular sealing-rubber member has a wall that gradually decrease toward said protruding end.

7. A cylindrical vibration-isolating device according to claim 1, wherein said corresponding end face of said inner metal sleeve which is surrounded by said annular sealing-rubber member, is formed as a flat annular surface.

8. A cylindrical vibration-isolating device according to claim 1, wherein said annular sealing-rubber member is provided only at one of axially opposite end portions of said inner metal sleeve.

9. A cylindrical vibration-isolating device according to claim 8, wherein said device being installed in position such that said one of axially opposite end portions of said inner metal sleeve is located above of the other end portion of said inner metal sleeve in a vertical direction.

10. A cylindrical vibration-isolating device according to claim 1, wherein said elastic body includes an intermediate sleeve interposed between said inner and outer metal sleeves in a coaxial relationship with each other and being disposed in and bonded by vulcanization to said elastic body.

11. A cylindrical vibration-isolating device according to claim 1, wherein said elastic body has a pair of voids formed at respective circumferential portions thereof which are opposed to each other in one radial direction perpendicular to an axial direction of said inner metal sleeve.

12. A cylindrical vibration-isolating device according to claim 1, wherein said at least one of axially opposite end portions of said inner metal sleeve protrudes axially outwardly from a corresponding axial end face of said elastic body by an axial distance of not smaller than 5.0 mm.

13. A cylindrical vibration-isolating device according to claim 1, wherein said connecting rubber layer has a wall-thickness within a range of 0.5 mm–5.0 mm.

14. A cylindrical vibration-isolating device according to claim 1, wherein said protruding end portion of said annular sealing-rubber member has an arc shape.

15. A cylindrical vibration-isolating device according to claim 1, wherein said annular sealing-rubber member has inner and an outer circumferential surfaces which are radially outwardly inclined by the same angle with respect to an axis of said inner metal sleeve so that said annular sealing-rubber member extends axially outwardly with a substantially constant wall thickness.

16. A cylindrical vibration-isolating device according to claim 1, wherein said annular sealing-rubber member has an outer circumferential surface extending axially outwardly with a slight inclined angle, while having an inner circumferential surface extending straightly in an axially outward direction.

17. A cylindrical vibration-isolating device according to claim 1, wherein said annular sealing-rubber member has inner and outer circumferential surfaces formed as an outwardly curved surface.

* * * * *